United States Patent [19]

Schulz et al.

[11] 3,937,309
[45] Feb. 10, 1976

[54] MULTIPLE SPEED HUB FOR A BICYCLE AND LIKE VEHICLE

[75] Inventors: Horst Schulz, Friedrichshafen; Erich Hild, Schweinfurt; Werner Steuer, Oerlenbach; Karl-Heinz Schmidt, Schweinfurt; Ewald Eisend, Grafenrheinfeld; Karlheinz Löffler, Hassfurt; Josef Flösser, Schweinfurt; Reinhard Kessler, Schwebheim, all of Germany

[73] Assignee: Fichtel & Sachs AG, Schweinfurt am Main, Germany

[22] Filed: July 10, 1974

[21] Appl. No.: 487,151

[30] Foreign Application Priority Data

July 25, 1973 Germany............................ 2337725

[52] U.S. Cl. ............................... 192/6 A; 74/750 B
[51] Int. Cl.² ...................... B06L 1/00; F16H 3/44
[58] Field of Search .................... 74/750 B; 192/6 A

[56] References Cited
UNITED STATES PATENTS

| | | |
|---|---|---|
| 3,102,436 | 9/1963 | Schuller............................ 192/6 A X |
| 3,113,652 | 12/1963 | Schwerdhöfer.................... 192/6 A |
| 3,122,226 | 2/1964 | Schuller et al..................... 192/6 A |
| 3,200,669 | 8/1965 | Schwerdhöffer................ 192/6 A X |
| 3,828,627 | 8/1974 | Schwerdhöfer................. 192/6 A X |

*Primary Examiner*—Leonard H. Gerin
*Attorney, Agent, or Firm*—Hans Berman; Kurt Kelman

[57] ABSTRACT

The driver in a three-speed bicycle hub may be coupled alternatively with the planet carrier or the ring gear of the planetary gear transmission in the hub shell by means of radial arms on a coupling sleeve which is shifted axially between terminal positions of engagement with the carrier and the ring gear respectively for highest and intermediate transmission ratio. The engaged ring gear may further be shifted axially by the coupling sleeve from its normal position against the restraint of a spring to establish a third, lower transmission ratio. The coupling elements of the planet carrier and ring gear are normally closer to each other than the axial length of the coupling sleeve arms. The radial arms cammingly cooperate with coupling elements on the planet carrier and/or the ring gear to shift the arms automatically into a terminal position from any intermediate position in response to relative rotation of the associated transmission members.

5 Claims, 42 Drawing Figures

MULTIPLE SPEED HUB FOR A BICYCLE AND LIKE VEHICLE

This invention relates to multiple speed hubs for bicycles and like vehicles, and particularly to an improved transmission for such hubs.

It is known to provide bicycle hubs with internal planetary gearing and to couple the input member of the transmission alternatively to the planet carrier and to the ring gear of the transmission for producing the desired different output speeds. A coupling member driven by the input member may axially be moved in the hub between positions of engagement with respective coupling elements on the planet carrier and the ring gear. It is desirable that the path of the coupling member be short so that torque transmission from the input member to the output member of the transmission not be interrupted for any significant period. Also, space in a bicycle hub is limited, and it is desirable that the transmission be axially short so as to leave space for an internal brake or the like. Yet, jamming of the transmission, as by simultaneous driving engagement of the coupling member by the planet carrier and the ring gear, must be avoided.

The same problems exist in multiple speed hubs in which the planet carrier is fixedly coupled to the input member of the transmission, and the hub shell, the usual output member of the transmission, may be driven alternatively by pawls on a carrier that may be coupled to the planet carrier or to the ring gear. Other variations of planetary gearing in a wheel hub for a bicycle or like vehicle similarly use coupling elements on rotating transmission member for selecting a desired transmission ratio, and the coupling arrangement of this invention is applicable to many such variations although it will be described hereinafter in its application to a bicycle hub in which the driver may be coupled alternatively to the planet carrier and to the ring gear.

Known devices for ensuring practically uninterrupted torque transmission between the input and output members of the hub transmission during changes in transmission ratio are relatively complex and bulky if they are reliable in their operation, and others, which are less costly to build, are subject to malfunctioning due to wear after a relatively short period.

It is a primary object of this invention to provide an improved, multiple-speed transmission for use in vehicle hubs of the type described in which substantially continuous torque transmission during speed changes is achieved in a simple manner utilizing coupling elements which have a long useful life.

In one of its more specific aspects, the invention provides a vehicle hub with an improved transmission in which first, second, and third transmission members are mounted for rotation about a common axis and carry respective first, second, and third coupling elements. The second and third members are connected for simultaneous rotation about the common axis at different speeds in axially spaced relationship. Each coupling element has a circumferentially directed engagement face. The first transmission member may be shifted axially between two terminal positions in which its engagement face circumferentially abuts against the engagement faces of the second and third elements respectively during the rotation of the transmission members.

One of the second and third transmission members is biased resiliently toward a normal position adjacent the other one of the second and third transmission members. In this normal position, the axial spacing of the second and third coupling elements is smaller than the axial length of the first coupling element. The first and second elements cammingly cooperate for axially moving the first transmission member into one of its terminal positions in response to relative angular displacement of the first and second members while the first transmission member is in an axial position spacedly intermediate its terminal positions.

Additional features, further objects, and many of the attendant advantages of this invention will readily be appreciated as the same becomes better understood by reference to the following detailed description of preferred embodiments when considered in connection with the appended drawing in which:

FIGS. 9A, 9B, and 9C, jointly designated FIG. 9, show modifications of the device of FIG. 8;

FIGS. 10A, 10B, 10C, 11A, 11B, 11C, 12A, 12B, 12C, 13A, 13B, 13C, 14A, 14, B, 14C, 15A, 15B, 15C, 16A, 16, B, 16C, 17A, 17B, and 17C show further modifications of the device of FIG. 8 in corresponding triple views;

Figure 1:
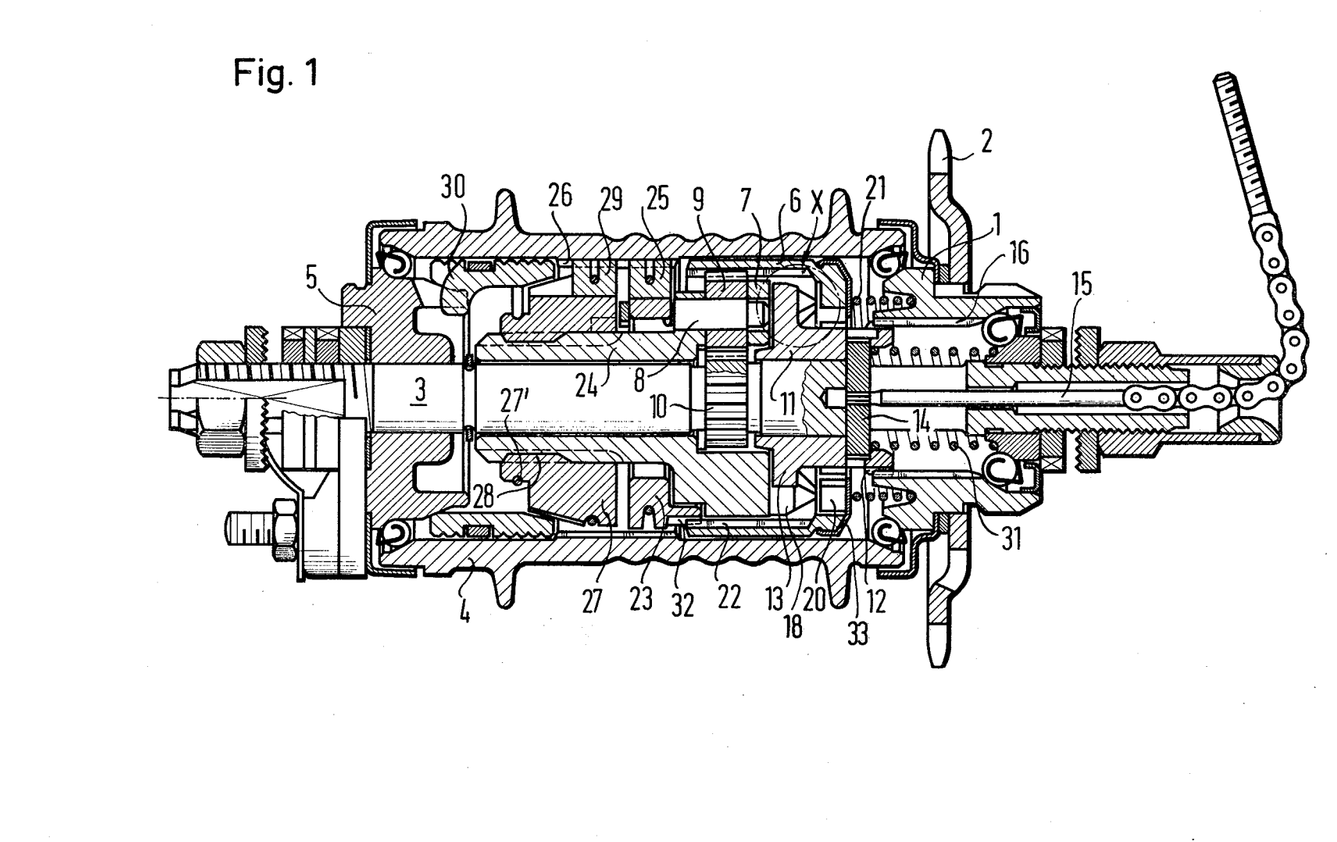
FIG. 1 shows a three-speed hub for the rear wheel of a bicycle or like vehicle in rear-elevational section on its axis.

Referring now to the drawing in detail, and initially to FIG. 1, there is shown a three-speed hub for the rear wheel of a bicycle or like vehicle. The input member for the three-speed transmission in the hub is a tubular driver 1 carrying a fixed sprocket 2 for a non-illustrated drive chain. The driver 1 is rotatably supported on a shaft 3 by means of a ball bearing, and itself provides the inner bearing ring for a ball bearing in one axial end of a hub shell 4. The other axial end of the shell 4 is supported by means of yet another ball bearing on a bearing member 5 fixedly fastened to the shaft 3. The shaft is normally fixedly attached to the non-illustrated bicycle frame.

Figure 6:
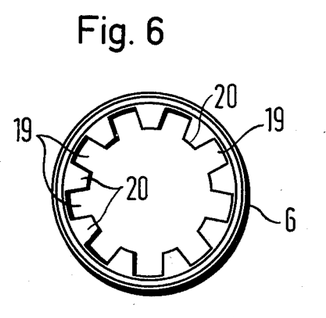
FIG. 6 is a side-elevational view of a ring gear in the hub of FIG. 1.
Figure 7:
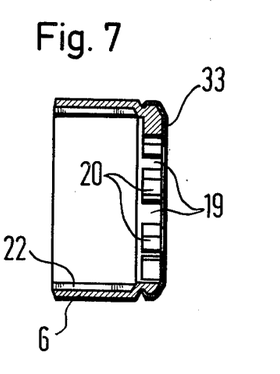
FIG. 7 shows the ring gear of FIG. 6 and an associated cover in rear elevational section on the hub axis.

Planetary gearing in the hub shell 4 permits rotary motion to be transmitted from the driver 1 to the hub shell 4 at three different speeds or transmission ratios. The planetary gearing includes an internally toothed ring gear 6, best seen in FIGS. 6 and 7, whose outer axial wall rotatably engages an inner face of the hub shell 4, and which is capable of limited axial movement from the illustrated position against the restraint of a helical compression spring 21.

Figure 2:
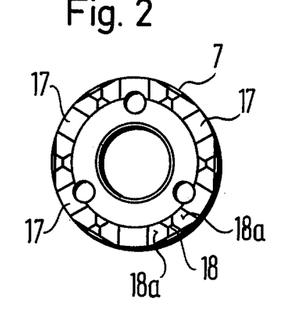
FIG. 2 shows a planet carrier in the hub of FIG. 1 in side elevation.
Figure 3:
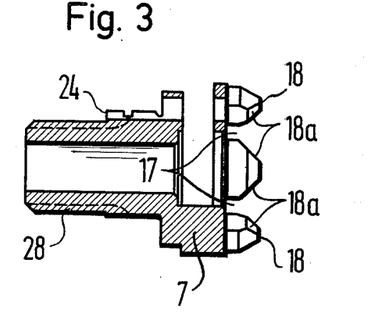
FIG. 3 illustrates the planet carrier of FIG. 2 in the manner of FIG. 1.
Figure 4:
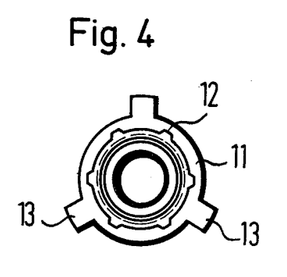
FIGS. 4 and 5 show a coupling sleeve in the hub of FIG. 1 in views corresponding to those of FIGS. 2 and 3 respectively.
Figure 5:
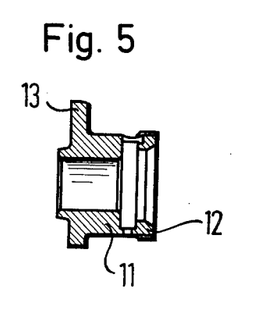

An axially secured planet carrier 7, shown in more detail in FIGS. 2 and 3, has a tubular sleeve portion 24 rotatably engaging the shaft 3 and a flange portion carrying planet shafts 8 spacedly parallel to the axis of the shaft 3 and carrying respective planet gears 9, only one planet gear being shown. The planet gears 9 mesh with the axially elongated internal teeth 22 of the ring gear 6 in all axial positions of the ring gear, and they simultaneously mesh with a sun gear 10 fixedly mounted on or integral with the shaft 3. Torque may be transmitted from the driver 1 to the ring gear 6 or alternatively to the planet carrier 7 by a coupling sleeve 11 carrying six, equiangularly spaced, external, axial ribs 12 and three radial arms 13 offset 120° from each other, as is best seen in FIGS. 4 and 5. A recess in the sleeve 11 is engaged by a slide 14 axially movable in a slot of the shaft 3 and projecting radially from the shaft. The slide 14 and the sleeve 11 are biased toward the left, as viewed in FIG. 1, and into the illustrated position by a helical return spring 31, and may be moved axially against the restraint of the spring 31 by a manually operated speed shifting mechanism, conventional in itself, and including a pull rod 15 coaxially received in a bore of the shaft 3 and attached to the slide 14.

Internal ribs 16 on the driver 1 are of sufficient axial length to engage the ribs 12 on the coupling sleeve 11 in all axial positions of the latter. In the illustrated position of the sleeve 11, the three radial arms 13 of the sleeve are received in respective recesses 17 in the flange portion of the planet carrier 7, the planet carrier being provided with six recesses 17 which are open in both radial directions, open axially toward the driver 1, and circumferentially separated from each other by projections 18 whose free axial ends are beveled so that two cam faces 18a on each projection 18 face obliquely in a common axial direction and in opposite circumferential directions.

In addition to the teeth 22, the ring gear 6 carries nine projections 20 directed radially inward, axially remote from the planet carrier 7, and circumferentially bounding nine recesses 19 therebetween, the recesses being dimensioned to receive the arms 13 of the coupling sleeve 11 when the sleeve is moved toward the right from the position shown in FIG. 1. The recesses 19 are closed axially toward the driver 1 by an annular sheet metal cover 33. The rim of the ring gear 6 axially remote from the cover 33 is coupled in the illustrated position of the ring gear 6 to an axially secured, annular pawl carrier 23, the teeth 22 of the ring gear engaging external teeth 32 of the pawl carrier. Pawls 25 on the pawl carrier 23 are spring-biased toward engagement with axially elongated ratchet teeth 26 on the inner face of the hub shell 4.

A brake cone 27 is mounted on the sleeve portion 24 of the planet carrier 7 by means of right-handed square threads 28, and carries pawls 29, spring-biased toward engagement with the afore-mentioned ratchet teeth 26 on the hub shell 4. Angular movement of the brake cone 27 relative to the shaft 3 is impeded by a friction spring 27' so that the brake cone is held in the illustrated axial position near the pawl carrier 23 during forward rotation of the hub shell 4. During back-pedaling, the spring 27' causes the cone 27 to move axially toward the left on the threads 28 into spreading engagement with a slotted brake ring 30 secured against rotation to the fixed bearing member 5. The brake ring 30, when expanded by the cone 27, frictionally engages the inner wall of the hub shell 4, as is conventional in coaster brakes.

In the illustrated high-speed position of the hub, driving torque is transmitted from the sprocket 2 to the hub shell 4 by the driver 1, the coupling sleeve 11, the planet carrier 7, the planet gears 9, the ring gear 6, the teeth 32, the pawl carrier 23, and the pawls 25 so that the ring gear 6 and the pawls 25 drive the hub shell 4 at a speed higher than that of the driver 1 and of the planet carrier 7. During back-pedaling, the brake cone 27 is shifted toward the left due to backward rotation of the planet carrier at the speed of the driver 1.

When the coupling sleeve 11 is shifted toward the right, as viewed in FIG. 1, until its arms 13 enter the recesses 19 in the ring gear 6 and abut against the cover 33 without causing axial movement of the ring gear 6 from the illustrated position, the ring gear is directly coupled to the driver 1, turns at the same speed as the driver, and causes the pawls 25 to turn the hub shell 4 at the intermediate speed of the driver. The planet carrier 7 is turned more slowly by the planet gears 9 and actuates the brake cone 27 during back pedaling. The pawls 29 on the brake cone 27 rotate more slowly than the pawls 25 on the ring gear 6 during forward pedaling in the high gear or in the intermediate gear condition of the hub, and are overtraveled by the hub shell 4. During back-pedaling, the pawls 25, 29 and the ratchet teeth 26 cannot transmit torque to each other.

When the coupling sleeve 11 is moved from the intermediate gear or speed position further toward the driver 1 by the speed changing mechanism, it shifts the ring gear 6 axially against the restraint of the spring 21 until its teeth 22 are disengaged from the teeth 32 of the pawl carrier 23, thereby inactivating the pawls 25. Torque now is transmitted from the sprocket 2 to the hub shell 4 at the lowest available transmission ratio by way of the driver 1, the coupling sleeve 11, the ring gear 6, the planet gears 9, the planet carrier 7, the brake cone 27, and the pawls 29 while the pawls 25 idle. During back-pedaling, the brake cone 27 moves threadedly on the bearing portion 24 of the planet carrier 7, and no torque is transmitted by the pawls 29.

The brake functions reliably while the hub is in any one of its three speed or gear conditions, and a continuous drive train is available between the driver 1 and the brake cone 27 for engagement of the coaster brake during shifting from the intermediate speed to the slow speed while the arms 13 remain engaged with the recesses 19 in the ring gear 6. Provisions are made in the hub of the invention to prevent loss of brake reliability during shifting between the illustrated high speed condition and the intermediate speed condition while the arms 13 move axially between the recesses 17 in the planet carrier 7 and the recesses 19 in the ring gear 6.

FIG. 8 shows the coupling elements which alternatively connect the driver 1 directly to the planet carrier 7 or to the ring gear 6, the carrier and gear being connected to each other at all times for simultaneous rotation at different speeds by the planet gears 9, and being biased by the spring 21 toward the normal relative position shown in FIG. 1 in which they are adjacent each other. As is evident from FIG. 1, the tips of the projections 18 which constitute the coupling elements of the planet carrier 7 are axially very close to the projections 20 constituting coupling elements on the ring gear 6, and the axial dimension of the coupling arms 13 on the sleeve 11 is much greater than the axial spacing of the projections 18, 20. The ring gear 6 may yield under pressure exerted by the sleeve 11 against the axial restraining force of the spring 21, but the coupling arms 13 may jam the transmission or reach a position intermediate their axially terminal positions determined by the range of movement of the sleeve 11 in which they cannot transmit torque during forward or backward rotation of the driver 1 without the safeguards provided by this invention.

Figure 8A:
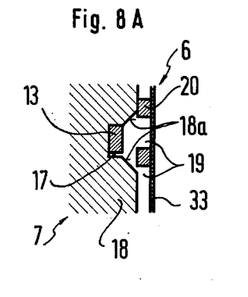
FIG. 8 shows elements of the hub within the chain-dotted circle X in FIG. 1 in three fragmentary developed views respectively labeled FIG. 8A, FIG. 8B, and FIG. 8C which illustrate respective operating positions of these elements.

FIG. 8A shows only the coupling elements 13, 18, 20 of the three transmission members 11, 7, and 6 which normally rotate about the common hub axis, the coupling elements being in the relative position associated with the high speed condition of the hub. The arm 13 is received in a recess 17. An engagement face of the arm 13 which is located substantially in a plane through the axis of the hub is directed circumferentially toward a corresponding engagement face of a projection 18, and abuts against the engagement face of the projection during rotation of the transmission members in response to forward pedaling. A cam face 18a of the projection 18 is contiguously adjacent the afore-mentioned engagement face of the projection and obliquely inclined relative to the latter at an angle of 225° so that the recess 17, which is partly bounded by the cam face, flares axially toward the ring gear 6. The axial depth of the recess 17 is almost twice the axial dimension of the arm 13, and its circumferential minimum width is greater than the corresponding dimension of the arm by only a small fraction of the last-mentioned dimension to provide clearance for axial movement of the arm 13.

Figure 8B:
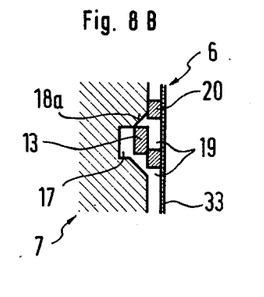
Figure 8C:
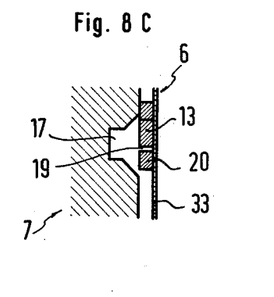

When the pull rod 15 is moved outward of the shaft 3 to shift the hub into intermediate speed, the arm 13 is moved initially into the position shown in FIG. 8B in which the arm 13 is out of effective torque transmitting engagement with the projections 18, 20. The wheel mounted on the hub in a conventional manner, not shown, cannot be driven by forward pedaling, nor can the brake be operated by back-pedaling in the position of the sleeve 11 indicated in FIG. 8B. However, the sleeve 11 is turned forward during normal pedaling while the planet carrier normally slows down when not driven. The arm 13, therefore, is shifted axially away from the planet carrier 7 by the camming engagement of the face 18a with a cooperating portion of the arm 13. If a recess 19 is axially aligned with the arm 13 at this stage, the arm slips readily into its intermediate speed position shown in FIG. 8C. If a projection 20 initially stands in the axial path of the arm 13, the ring gear 6 yields, and the spring 21 returns the ring gear to its normal position shown in all views of FIG. 8 as soon as the arm 133 can drop into a recess 19 during the relative angular displacement of the sleeve 11 and the ring gear 6, the latter normally moving faster than the sleeve 11 at this stage because of the speed-increasing action of the planet gears 9.

If the sprocket 2 is turned backward for braking while the sleeve 11 is in the indeterminate position shown in FIG. 8B, the arm 13 is guided into a recess 19 of the ring gear 6 by another cam face on the other projection 18 bounding the recess 17 in a manner closely analogous to the procedure described above, and not requiring more detailed explanation.

The cam arrangement which responds to relative angular displacement of the sleeve 11 and of the planet carrier 7 for axially moving the sleeve into one of its terminal positions when the arm 13 is in an intermediate axial position, may be modified in many ways by providing oblique cam faces on the coupling elements of more than one of the transmission members, or on a transmission member other than the planet carrier 7.

In each of FIGS. 9 to 17, such alternative solutions to the problem of providing virtually uninterrupted torque transmission between the driver 1 and the hub shell 4, and of avoiding jamming of the transmission during gear shifting, are illustrated. FIG. 9A shows the spatial relationship of modified coupling elements in the high speed condition of the hub, FIG. 9C illustrates the intermediate speed condition, and FIG. 9B shows a transitional condition which is not normally capable of being maintained for any significant length of time, more than a fraction of a second. The three views of FIGS. 10 to 17 illustrate corresponding hub conditions. The modified rotating transmission members, their coupling elements, and other features corresponding to those described with reference to FIGS. 1 to 8 are provided with three-digit reference numerals of which the last two digits are identical with the reference numbers used in FIGS. 1 to 8. Some features shown in FIGS. 9 to 17 will not be described in detail. As far as not shown in FIGS. 9 to 17, the modified hubs are identical with the apparatus described with reference to FIGS. 1 to 8.

The normal, axial spacing of the coupling elements on the planet carrier 107 and on the ring gear 106 shown in FIG. 9 is somewhat greater than in the apparatus of FIGS. 1 to 8, but is still smaller than the axial dimension of the coupling arm 113 on the coupling sleeve, not illustrated otherwise. The grooves 117 of the planet carrier are bounded circumferentially by parallel, flat engagement faces over their entire axial length, the deviation of engagement faces from respective planes through the hub axis being insignificant. The arm 113 has two obliquely inclined cam faces 113a, symmetrical relative to the axial median plane of the arm and converging axially toward the planet carrier 117. The ring gear 106 is not significantly different from the afore-described gear 6.

Figure 9A:
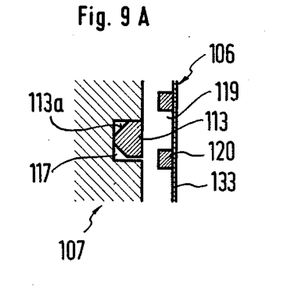
Figure 9B:
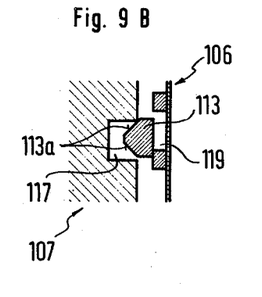
Figure 9C:
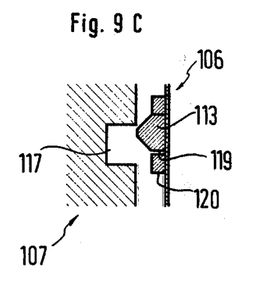

The cam faces 113a cooperate with approximately radial edges of the projections bounding the recess 117 for shifting the arm 113 from the inoperative position illustrated in FIG. 9B into the intermediate speed position of FIG. 9C. If necessary, the ring gear 106 may move axially, as described above, while the planet carrier 107 is axially fixed.

Figure 10:
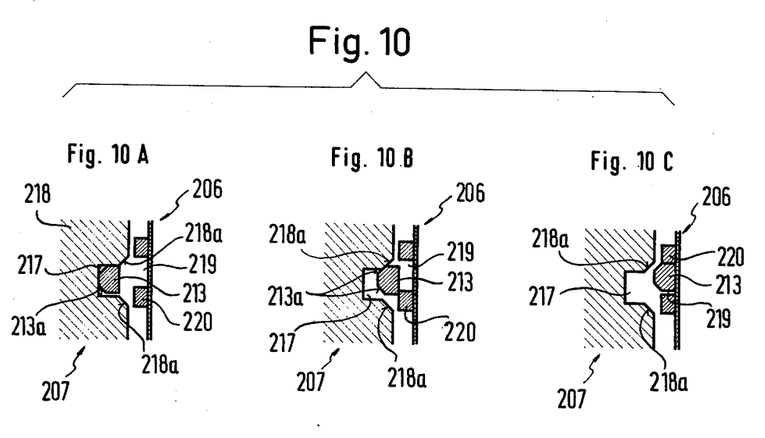

The coupling elements shown in FIG. 10 combine cam faces 218a on the projections 218 of the planet carrier 207 with cam faces 213a on the arm 213 of the coupling sleeve. The cam faces correspond closely to those shown on coupling elements in FIGS. 8 and 9 respectively and provide the same mode of operation.

Figure 11:
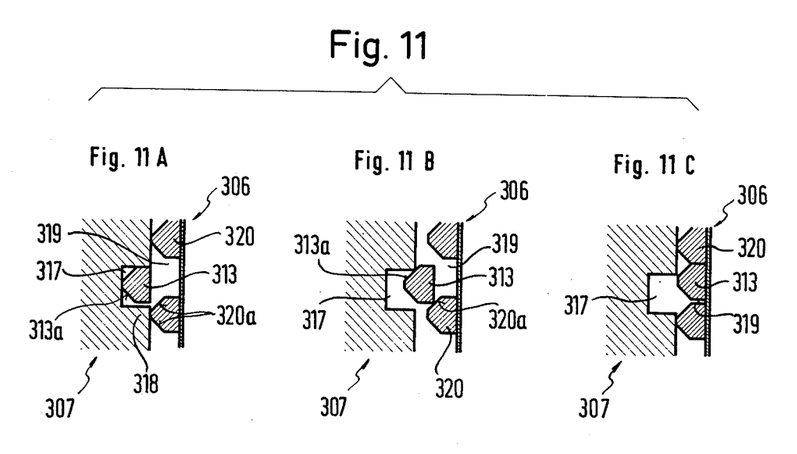

Cam faces 320a inclined at angles of 225° to the contiguously adjacent, substantially axial and circumferentially directed engagement faces of the projections 320 of the ring gear 306 in the device illustrated in FIG. 11 supplement the effect of cam faces 313a on the arms 313 of the coupling sleeve which are closely similar to the afore-described cam faces 113a. The recesses 317 in the planet carrier 307 are circumferentially bounded over their entire axial length by planar and practically parallel engagement faces of the projections 318.

In the normal operating condition, the ring gear 306 is held in the axial position shown in FIGS. 11A and 11C. During gear shifting, it may yield as is shown in

FIG. 11B.

Figure 12:
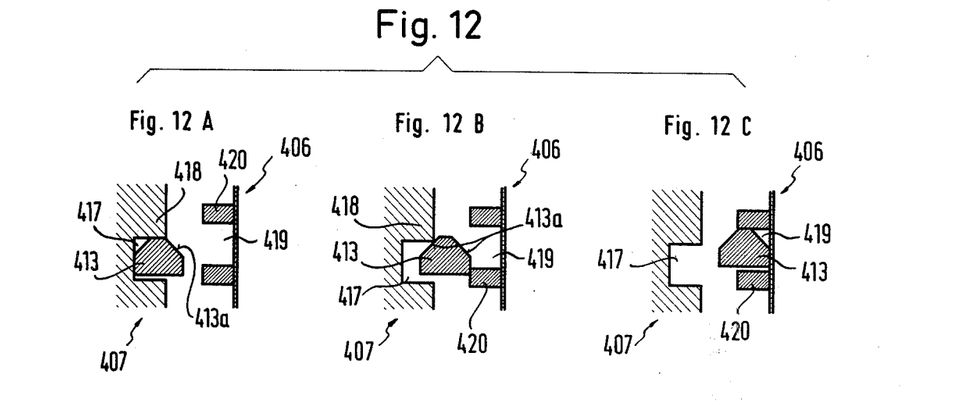

The coupling arm 413 shown in FIG. 12 cooperates with projections 418, 420 on the planet carrier 407 and the ring gear 406 which have flat, practically axial engagement faces bounding respective recesses 417, 419. The arm 413 has two cam faces 413a inclined at opposite angles of 225° relative to the axial engagement faces of the arm and symmetrical relative to a plane which intersects the hub axial at right angles. With this configuration of the arm 413, the driver 1 is quickly coupled to the ring gear 406 during forward pedaling by traction simultaneously applied to the coupling sleeve by the gear shifting mechanism. The coaster brake can safely be used after the intermediate-speed position of FIG. 12C is reached.

Figure 13:
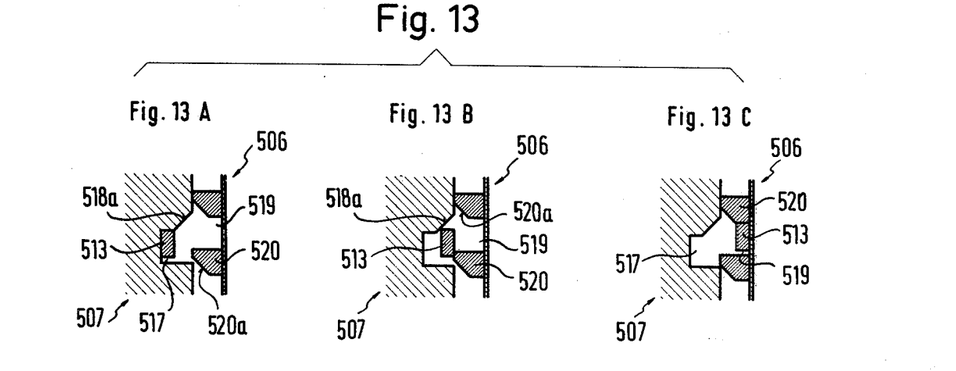

An asymmetrical arrangement of cam faces 518a on the planet carrier 507 and of cam faces 520a on the ring gear 506 is illustrated in FIG. 13. The arm 513 of the coupling sleeve is or rectangular cross section and the recesses 517 and 519 are each bounded in one circumferential direction by one planar, circumferential engagement face extending over the full axial depth of the recess and in the other circumferential direction by an axial engagement face dimensioned for cooperation with a corresponding engagement face of the arm 513, and by a cam face 518a, 520a inclined at an angle of 225° to the associated engagement face. The coupling arrangement operates as described with reference to FIG. 12.

Figure 14:
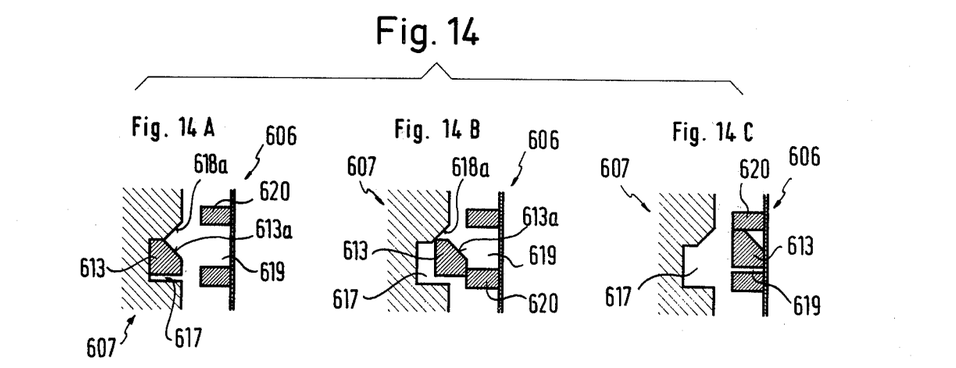

In the further modified coupling arrangement seen in FIG. 14, the planet carrier 607 and the coupling arm 613 have respective cam faces 618a, 613a which meet in the recess 617 of the planet carrier at right angles in the high-speed position shown in FIG. 14A. The mode of operation of this coupling arrangement will be described below in greater detail with reference to the closely similar device shown in FIG. 18.

Figures 15, 15A, 15B, 15C:
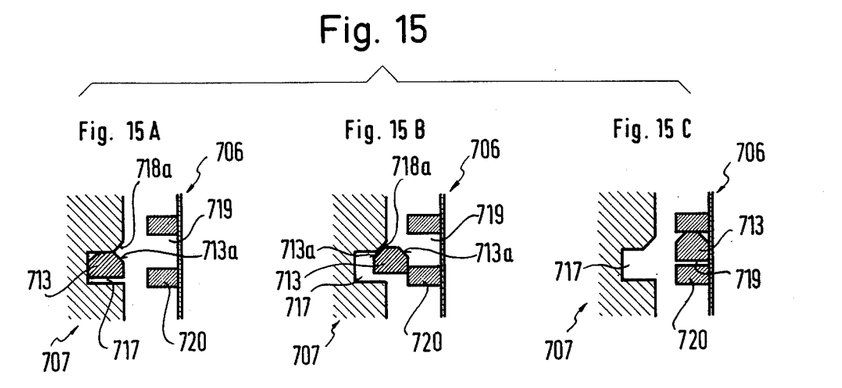

The coupling arrangement illustrated in FIG. 15 combines two axially aligned cam faces 713a on a coupling arm 713 analogous to the cam faces 413a shown in FIG. 12 with a single cam face 718a on the two projections which bound a recess 717 of the planet carrier 707. One of the cam faces 713a meets the cam face 718a at right angles in the high-speed position shown in FIG. 15A. The cam face 713a on the coupling arm 713 facilitates axial shifting of the ring gear 706 during the speed changing operation, if necessary, and the corresponding cam faces on coupling arms shown in FIGS. 12 and 14 and in other embodiments of the invention described hereinbelow have the same function.

Figures 16, 16A, 16B, 16C:
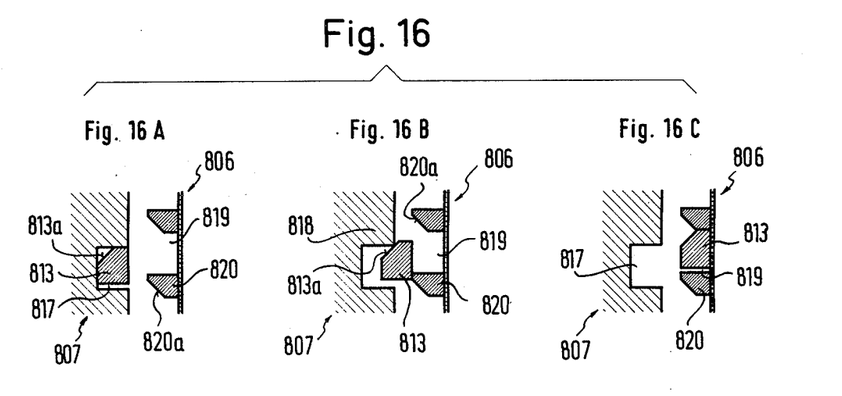

The coupling arm 813 shown in FIG. 16 has a single cam face 813a obliquely directed toward the engagement face of the planet carrier 807 which is abuttingly engaged by the coupling sleeve during forward rotation of the driver in the high-speed condition of the hub. However, the cam face 813a is located in the bottom of the recess 817 in the high-speed condition and cammingly cooperates with a radial edge of the projection 818 only after the arm 813 has moved outward of the recess 817 a distance equal to the axial dimension of the engagement face contiguously adjacent to the cam face 813a. The projections 820 of the ring gear 806 carry cam faces 820a closely analogous to the cam faces 520a described with reference to FIG. 13. The cam faces 820a cammingly cooperate with a radial edge of the arm 813, and thus are larger than would be necessary if the arm carried a cam face engaging a face 820a during shifting from high to normal hub transmission ratio.

Figures 17, 17A, 17B, 17C:
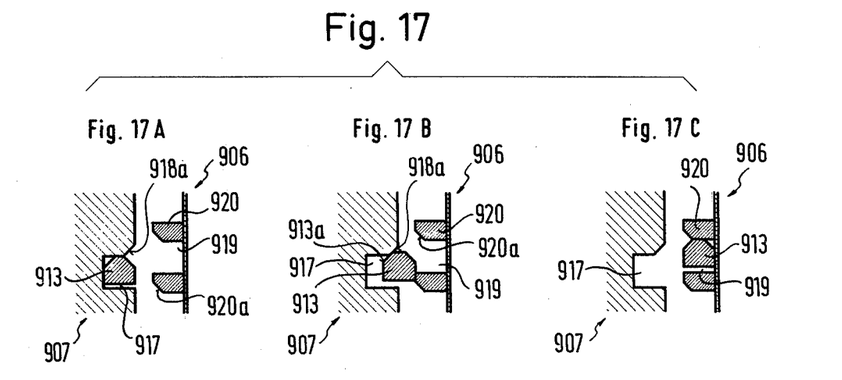

Such an arrangement is illustrated in FIG. 17 in which the coupling arm 913 has two cam faces 913a in the manner of the arm 713 in FIG. 15 so that the cam faces 920a on the projection 920 of the ring gear 906 may be made smaller than the faces 820a shown in FIG. 16 under otherwise comparable conditions.

Necessary dimensional relationships of coupling arrangements of the invention and other detail features of structure and operation will now be described with reference to the five views 18A to 18E which jointly constitute FIG. 18 and show coupling elements similar to those seen in FIG. 14 on a larger scale.

Figure 18:
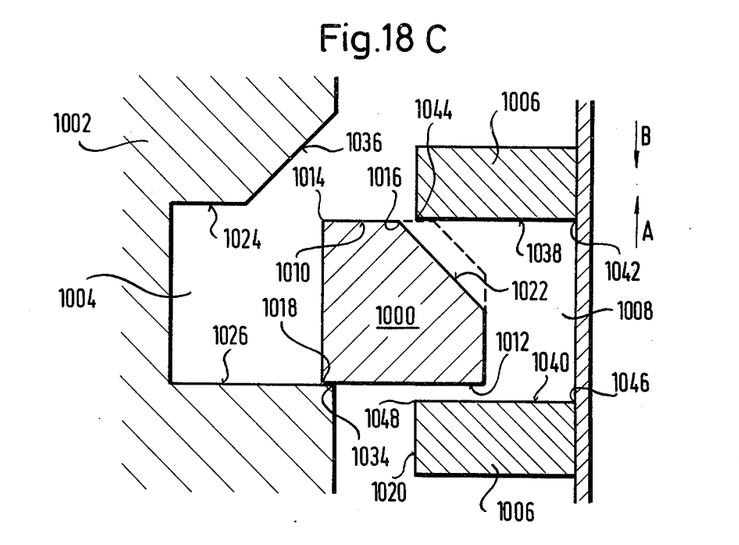
FIG. 18A shows a device similar to that of FIG. 14A on a larger scale and in greater detail.
FIGS. 18B to 18E show additional operating positions of the elements of FIG. 18A.
Figure 18A:
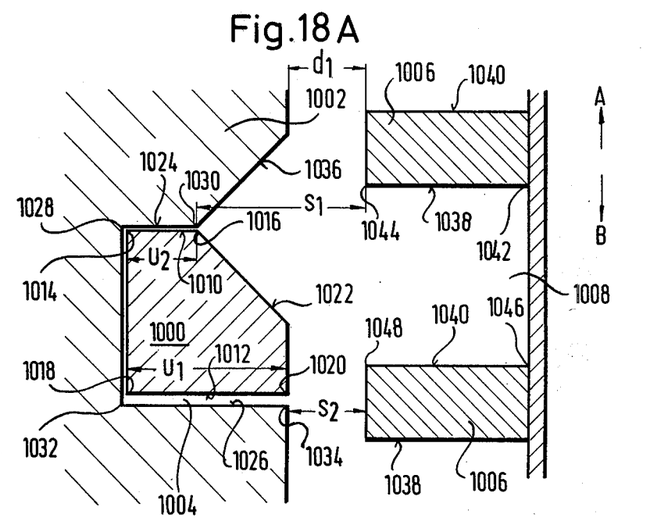

Referring to FIG. 18A, there is seen a first coupling element 1000 which is one of the coupling arms of a coupling sleeve, not otherwise shown. It drivingly cooperates with a second coupling element 1002 which is one of the projections on a planet carrier circumferentially bounding therebetween a recess 1004. Third coupling elements 1006 are projections on a ring gear and circumferentially bound recesses 1008 axially open toward the axially open sides of the recesses 1004, the apparatus being identical with that shown in FIG. 1 as far as not specifically illustrated and described otherwise. The projections 1006 are axially movable toward the right, as viewed in FIG. 18A, against the restraint of a spring while the projections 1000 are axially fixed. The axial spacing of the projections 1002, 1006 is smaller than the axial dimension of the coupling arm 1000.

The arm 1000 has an axially short engagement face 1010 circumferentially directed toward a corresponding engagement face 1024 of similar axial length on the projection 1002, the faces 1010, 1024 being abuttingly engaged when the arm 1000 is rotated in the direction of the arrow A during normal forward pedaling. An axially longer engagement face 1012 of the arm 1000 similarly cooperates with a matingly dimensioned engagement face 1026 on a projection 1002 during backpedaling when the arm 1000 turns in the direction of the arrow B.

The face 1010 is axially bounded by radial edges 1014, 1016, the face 1012 by radial edges 1018, 1020. The face 1024 is similarly bounded by edges 1028, 1030, and the face 1026 by edges 1032, 1034. The edge 1016 separates the engagement face 1010 of the arm 1000 from a cam face 1022 inclined relative to the engagement face 1010 at an angle of about 225°. A cam face 1036 is similarly separated from the engagement face 1024 of the projection 1002 by the edge 1030.

The axial depth of the recess 1004 is approximately equal to the axial dimension of the arm 1000 between the edges 1018, 1020, but the circumferential width of the recess 1004 between the faces 1024, 1026 is slightly greater than the circumferential width of the arm 1000 between the faces 1012, 1024 to provide clearance for axial movement, but only minimal lost motion between the arm 1000 and the faces 1024, 1026 when the direction of rotation of the arm is reversed.

The projections 1006 have each two axial engagement faces 1038, 1040 directed in opposite circumferential directions so that each recess 1008 is bounded by two engagement faces 1038, 1040 of respective projections 1006 extending between respective radial edges 1042, 1044 and 1046, 1048. The axial lengths of the faces 1038, 1040 are about equal to the corresponding dimension of the face 1012 on the arm 1000, and the circumferential width of each recess 1008 is about equal to the corresponding dimension of the recess 1004.

Dimensions whose relationship is important for proper functioning of the coupling arrangement shown in FIG. 18 are indicated by reference characters in FIG. 18D. The engagement face 1010 has an axial dimension $U_1$ equal to the axial spacing of the edges 1018, 1020. The shorter engagement face of the arm 1000 has an axial dimension $U_2$ between the edges 1014, 1016. An axial blocking distance $S_1$ is measured axially between the edge 1030 and the common radial plane of the edges 1044, 1048 of the projections 1006 when the latter are in their normal operating position. The blocking distance $S_2$ is measured between the radial planes defined by the radial edges 1034, 1044 of the engagement faces 1026, 1038 in the normal operating position of the latter.

For proper operation of the coupling arrangement, it is necessary that $U_1$ be smaller than $S_1$, and $U_2$ be smaller than $S_2$. $U_1$ and $U_2$ may be equal, and $S_1$ and $S_2$ may be equal. The dimensions $U_1$, $U_2$ need not necessarily be equal to the axial maximum dimension of the arm 1000. Also, the blocking distances $S_1$ and $S_2$ need not be equal to the shortest axial distance $d_1$ of the projections 1006 from the projections 1002 in the normal operating position of the projections 1006.

Figure 18B:
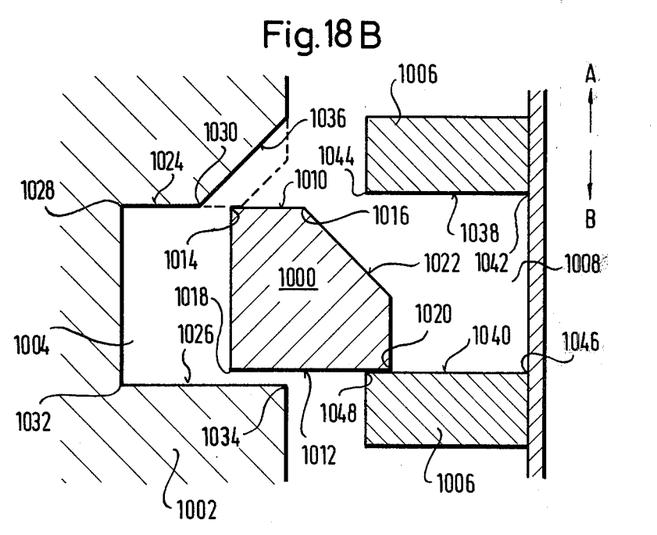

If these dimensional relationships are not satisfied, the planetary gearing may be jammed as will be shown with reference to FIGS. 18B and 18C which illustrate positions of the coupling arm 1000 intermediate its axially terminal positions.

The planetary gearing will be blocked or jammed whenever the arm 1000 simultaneously abuts against the projections 1002, 1006. Such a condition could occur in the apparatus of FIG. 18 if the cam faces 1036, 1022 were shifted into the locations indicated in FIGS. 18B, 18C in broken lines. In the hypothetical modification of FIG. 18B, the blocking distance $S_1$ would be smaller than the dimension $U_1$ and simultaneous abutting engagement of the faces 1010, 1012 of the arm 1000 with the face 1024 of the planet carrier and the face 1040 of the faster turning ring gear would block the transmission, all transmission members turning in the direction of the arrow A. In the fully drawn actual apparatus shown in FIG. 18B, the cam face 1036 of the projection 1002, when engaged by the edge 1014 of the arm 1000, causes the arm to move axially into the recess 1008 of the ring gear.

If the position shown in FIG. 18B is reached during back-pedaling for actuating the coaster brake, the face 1040 of the projection 1006 shown in engagement with the face 1012 moves opposite to the arrow A faster than the arm 1000 so that the face 1012 quickly engages the face 1026 of the projection 1002, whereupon the cam face 1022 is cammingly engaged by the edge 1044, and the arm 1000 is moved into the axial position illustrated in FIG. 18A, braking torque being transmitted from the driver 1 to the planet carrier by the abuttingly engaged faces 1012, 1026.

In the hypothetical modification of the coupling arrangement partly illustrated in FIG. 18C in broken lines, the blocking distance $S_2$ is smaller than the axial dimension $U_2$. If it is attempted to actuate the brake by turning the driver with the coupling sleeve and the arm 1000 in the direction of the arrow B, the arm 1000 would be wedged tight between a faster moving projection 1006 of the ring gear and a slower moving face 1026 of the planet carrier. The combined normal axial spacing $d_1$ of the projections 1002, 1006 and the axial distance $d_2$ through which the projections 1006 may be moved against the restraint of their backing spring must be equal at least to the greatest axial dimension of the arms 1000.

As is shown in FIG. 18D, the projections 1006 must be capable of yielding under the pressure exerted by the arm 1000 while the edge 1014 cammingly cooperates with the cam face 1036 until the arm 1000 is axially aligned with a recess 1008 during the relative angular movement of the coupling elements so that the backing spring (21 in FIG. 1) can return the projections 1006 to their normal position. If the direction of rotation of the arm 1000 is reversed in the position of FIG. 18D, adequate braking torque is transmitted as long as the faces 1012 and 1026 are axially coextensive over at least a portion of their axial lengths.

Figure 18E:
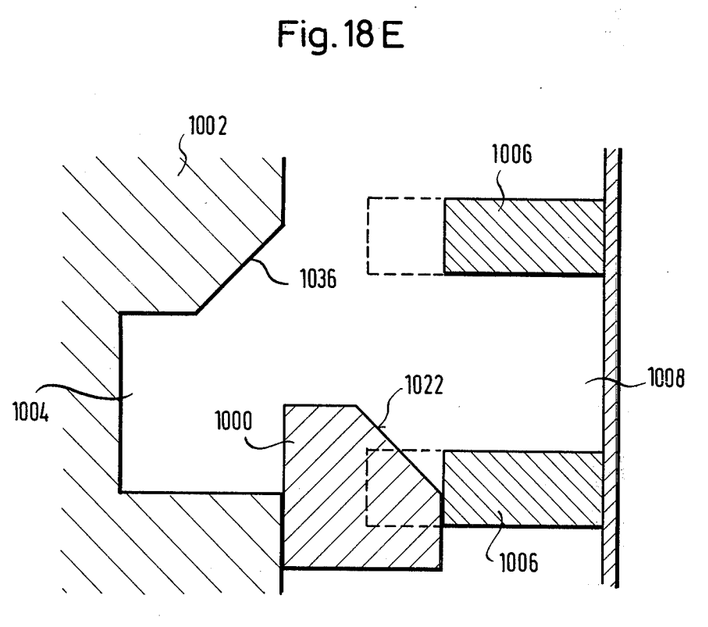

FIG. 18E shows an additional transitional condition of the coupling arrangement which might occur occasionally, and in which the arm 1000 is received between opposite radial faces of the projections 1002, 1006. No torque can be transmitted from the arm 1000 whether it turns forward or backward. This position can be maintained only momentarily and until the arm 1000 is brought into engagement with the coupling elements 1002 or 1006 by relative rotation of the coupling elements. No jamming of the transmission can occur.

The detailed discussion of a cam arrangement similar to that of FIG. 14 with reference to FIG. 18 is generally applicable to the several other coupling arrangements shown in FIGS. 8 to 13 and 15 to 17 in an obvious manner. The illustrated cam arrangements permit additional variations and permutations which will readily suggest themselves to those skilled in the art. It should be understood, therefore, that, within the scope of the appended claims, this invention may be practised otherwise than as specifically disclosed.

What is claimed is:

1. In a multiple speed vehicle hub including a driver member, a hub shell, and transmission means in said hub shell for rotating said hub shell at a plurality of alternative speeds when said driver member is rotated at a predetermined speed, the improvement in said transmission means which comprises:

a. first, second, and third transmission members mounted for rotation about a common axis and carrying respective first, second, and third coupling elements;

b. motion transmitting means connecting said second and third members for simultaneous rotation about said common axis at different speeds in axially spaced relationship,
   (1) each of said elements having a circumferentially directed engagement face;

c. shifting means for axially shifting said first member between two terminal positions in which the engagement face of said first element circumferentially abuts against the engagement faces of said second element and of said third element respectively during said rotation;

d. yieldably resilient means axially biasing one of said second and third members toward a normal relative position of said one member adjacent the other one of said second and third members, 1. the axial spacing of said second and third elements in said normal position of said second and third members being smaller than the axial length of said first element; and e. cam means on said first element and on said second element cooperating for axially moving said first member into one of said terminal positions thereof in response to relative angular displacement of said first and second members while said first member is in an axial position spacedly intermediate said terminal positions thereof.

2. In a hub as set forth in claim 1, said cam means including a cam face on one of said first and second elements obliquely inclined relative to the engagement face of said lastmentioned one element.

3. In a hub as set forth in claim 2, said axial length being smaller than the spacing of said second and third elements when said spacing is enlarged against the restraint of said yieldably resilient means.

4. In a hub as set forth in claim 2, said transmission means including a sun gear having an axis, a planet carrier and a ring gear mounted for rotation about said axis, and a planet gear rotatably mounted on said planet carrier in simultaneous meshing engagement with said sun gear and said ring gear, said planet carrier and said ring gear constituting respective ones of said second and third members.

5. In a hub as set forth in claim 1, said third member being axially biased by said yieldably resilient means toward said second member, said second member being axially fixed.

* * * * *